United States Patent
Wu et al.

(10) Patent No.: US 9,141,286 B2
(45) Date of Patent: Sep. 22, 2015

(54) ELECTRONIC DEVICE AND METHOD FOR DISPLAYING SOFTWARE INPUT INTERFACE

(75) Inventors: Liu-Wei Wu, New Taipei (TW); Jiun-Ru Hou, New Taipai (TW); Hsin-Chang Lai, New Taipei (TW); Han-Zen Chang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 350 days.

(21) Appl. No.: 13/609,649

(22) Filed: Sep. 11, 2012

(65) Prior Publication Data

US 2013/0234953 A1    Sep. 12, 2013

(30) Foreign Application Priority Data

Mar. 9, 2012   (TW) .............................. 101108072 A (51) Int. Cl.
*G06F 3/041* (2006.01)
*G06F 3/0488* (2013.01)

(52) U.S. Cl.
CPC .................................. *G06F 3/04886* (2013.01)

(58) Field of Classification Search
None
See application file for complete search history.

(56) References Cited

U.S. PATENT DOCUMENTS

2010/0277414 A1* 11/2010 Tartz et al. ..................... 345/169
2012/0162078 A1*  6/2012 Ferren et al. .................. 345/168

* cited by examiner

*Primary Examiner* — Alexander Eisen
*Assistant Examiner* — Kenneth B Lee, Jr.
(74) *Attorney, Agent, or Firm* — Novak Druce Connolly Bove + Quigg LLP (57) ABSTRACT

In a method for displaying an input interface on a touch panel of an electronic device, a first display area and a second display area are determined on the touch panel according to touch ranges of touch operations on the touch panel. The method obtains a first sub-keyboard and a second sub-keyboard of the input interface, displays the first sub-keyboard in the first display area by performing a zoom operation on the first sub-keyboard, and displays the second sub-keyboard in the second display area by performing the zoom operation on the second sub-keyboard.

13 Claims, 9 Drawing Sheets

FIG. 1

(Prior art)

ELECTRONIC DEVICE AND METHOD FOR DISPLAYING SOFTWARE INPUT INTERFACE

BACKGROUND

1. Technical Field

Embodiments of the present disclosure relate to software interface displaying technology, and particularly to an electronic device and method for separately displaying a software input interface in two display areas of a touch panel of the electronic device.

2. Description of Related Art

Many electronic devices are equipped with touch panels (e.g., a tablet computer), so that a user can input data through touch operations on a software input interface on the touch panel with a finger or a stylus. For example, the user can hold a left side and a right side of a tablet with two hands, and perform touch operations on the software input interface using two thumbs. However, because touch panels have become bigger and bigger, the thumbs cannot reach a center position (refer to an area "A" in FIG. 1) of the software input interface when holding the electronic device with two hands. Therefore, an improved method for displaying a software input interface on a touch panel of an electronic device is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
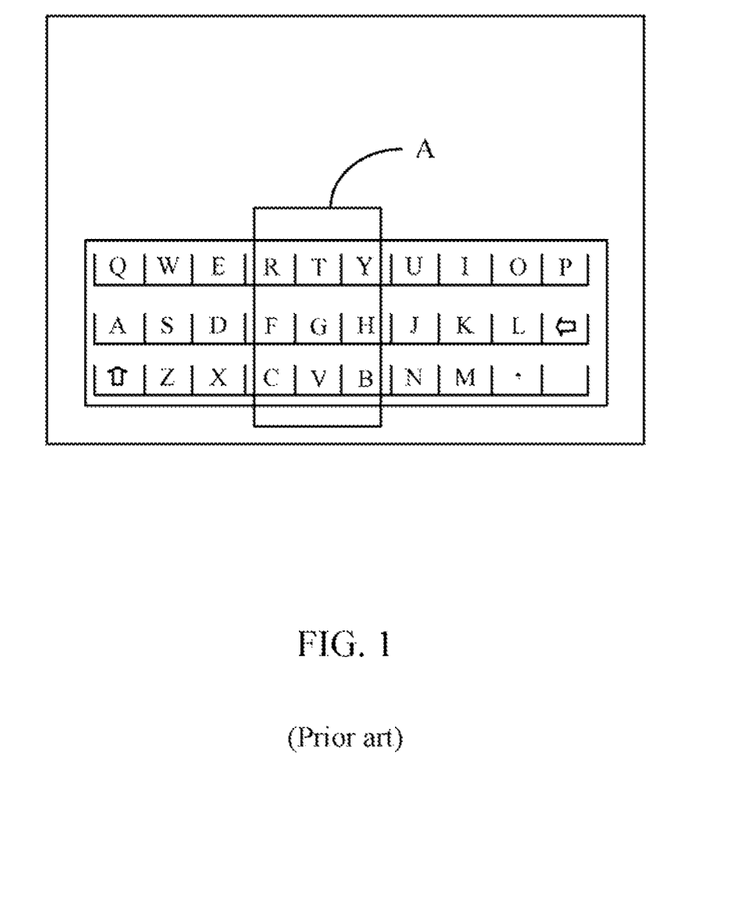
FIG. 1 is a schematic diagram of an example of a software input interface of an electronic device in the prior art.
Figure 2:
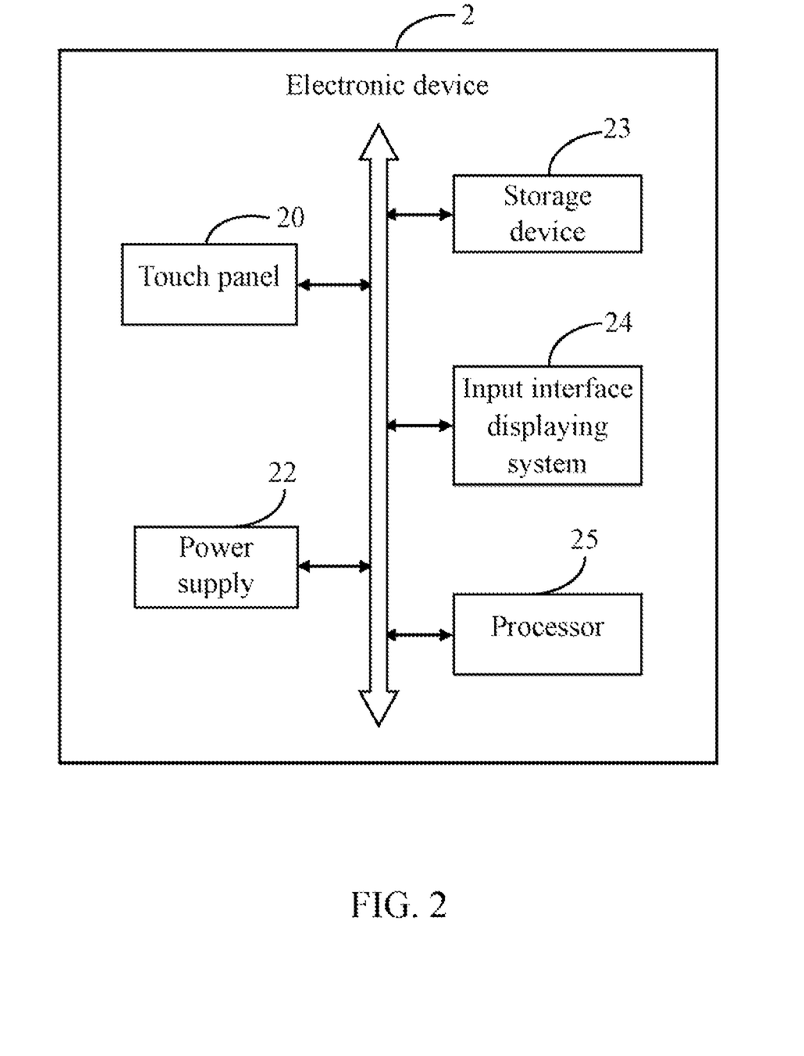
FIG. 2 is a schematic diagram of one embodiment of an electronic device including an input interface displaying system.

FIG. 2 is a schematic diagram of one embodiment of an electronic device 2 including an input interface displaying system 24. The electronic device 2 further includes a touch panel 20, a power supply 22, a storage device 23, and at least one processor 25. The electronic device 2 may be a tablet or a personal digital assistant (PDA). FIG. 1 illustrates only one example of the electronic device 2 that may include more or fewer components than illustrated, or have a different configuration of the various components in other embodiments.

The touch panel 20 may be resistive touch panels or capacitive touch panels, such as multi-touch panels. The power supply 22 provides power to the electronic device 2. The storage device 23 may be a non-volatile computer storage that can be electrically erased and reprogrammed, such as a flash memory card.

The input interface displaying system 24 divides an input interface of the touch panel 20 into two sub-interfaces, determine two display areas on the touch panel 20 according to touch ranges of touch operations of a user, and display the two sub-interfaces in the two display areas. In one embodiment, the input interface may be a software input interface used to receive user input data. The input interface displaying system 24 may include computerized instructions in the form of one or more programs that are executed by the at least one processor 25 and stored in the storage device 23 (or memory). A detailed description of the input interface displaying system 24 will be given in the following paragraphs.

Figure 3:
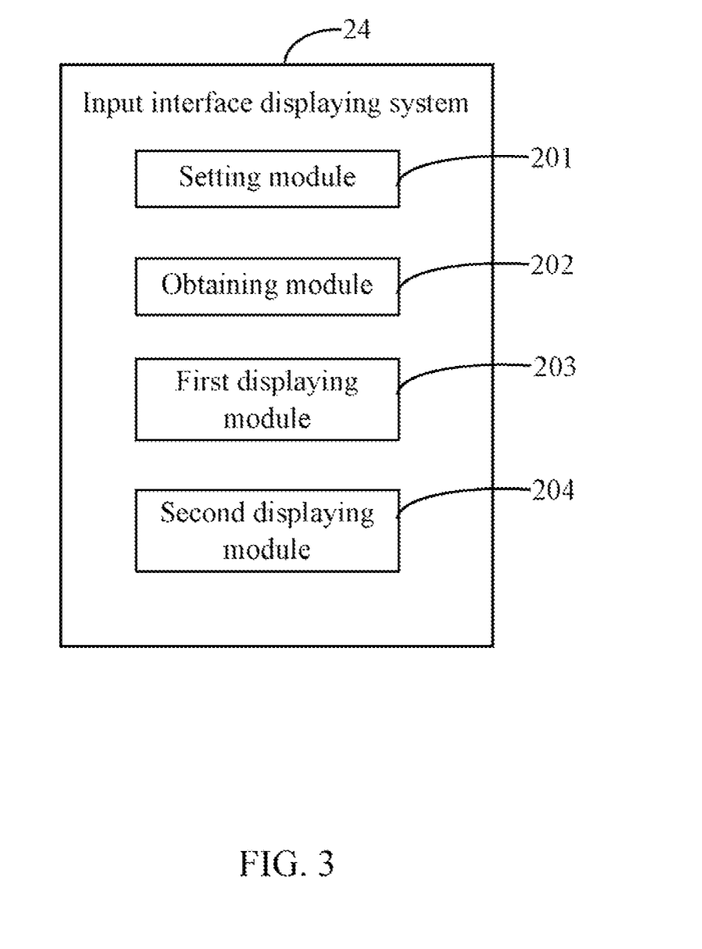
FIG. 3 is a schematic diagram of function modules of the input interface displaying system included in the electronic device.

FIG. 3 is a block diagram of function modules of the input interface displaying system 24 included in the electronic device 2. In one embodiment, the input interface displaying system 24 may include one or more modules, for example, a setting module 201, an obtaining module 202, a first displaying module 203, and a second displaying module 204. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, flash memory, and hard disk drives.

Figure 4:
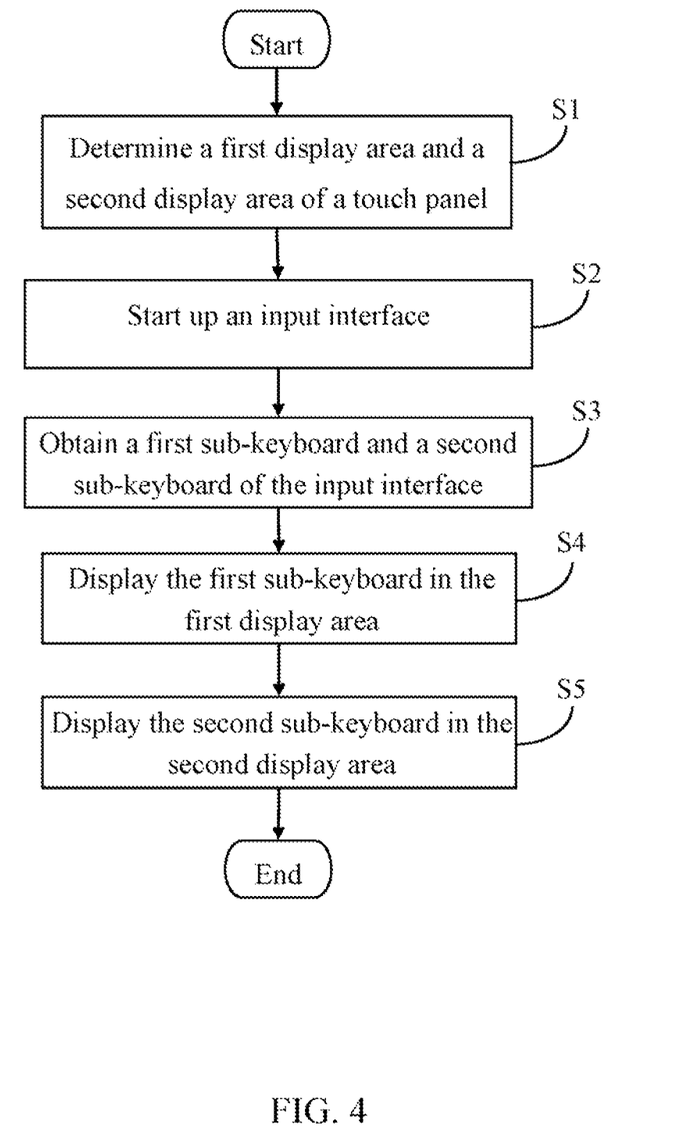
FIG. 4 is a flowchart of one embodiment of a method for displaying an input interface separately on a touch panel of the electronic device.

FIG. 4 is a flowchart of one embodiment of a method for displaying an input interface separately on the touch panel 20 of the electronic device 2. Depending on the embodiment, additional steps may be added, others removed, and the ordering of the steps may be changed.

In step S1, the setting module 201 determines a first display area and a second display area of the touch panel 20 of the electronic device 2 according to a reach range ("touch range") of fingers (e.g., thumbs) of a user or a stylus on the touch panel 20. The reach range may be according to when the user is holding the electronic device 2 using two hands of the users, in one example.

In one example, the setting module 201 determines a touch sensitive area of the electronic device 2. In one embodiment, the touch panel 20 is determined as the touch sensitive area of the electronic device 2.

The setting module 201 receives a first figure and a second figure drawn on the touch panel 20 by the user's fingers (e.g., the thumbs), determines representative points of the first figure and the second figure, and stores coordinates of the representative points in the storage device 23. In one embodiment, the first figure and the second figure may be curves or other suitable shapes. The first and second figures may be predetermined in some embodiments. The representative points include, but are not limited to, a start point, a middle point, and an end point of each of the first figure and the second figure.

Figure 5:
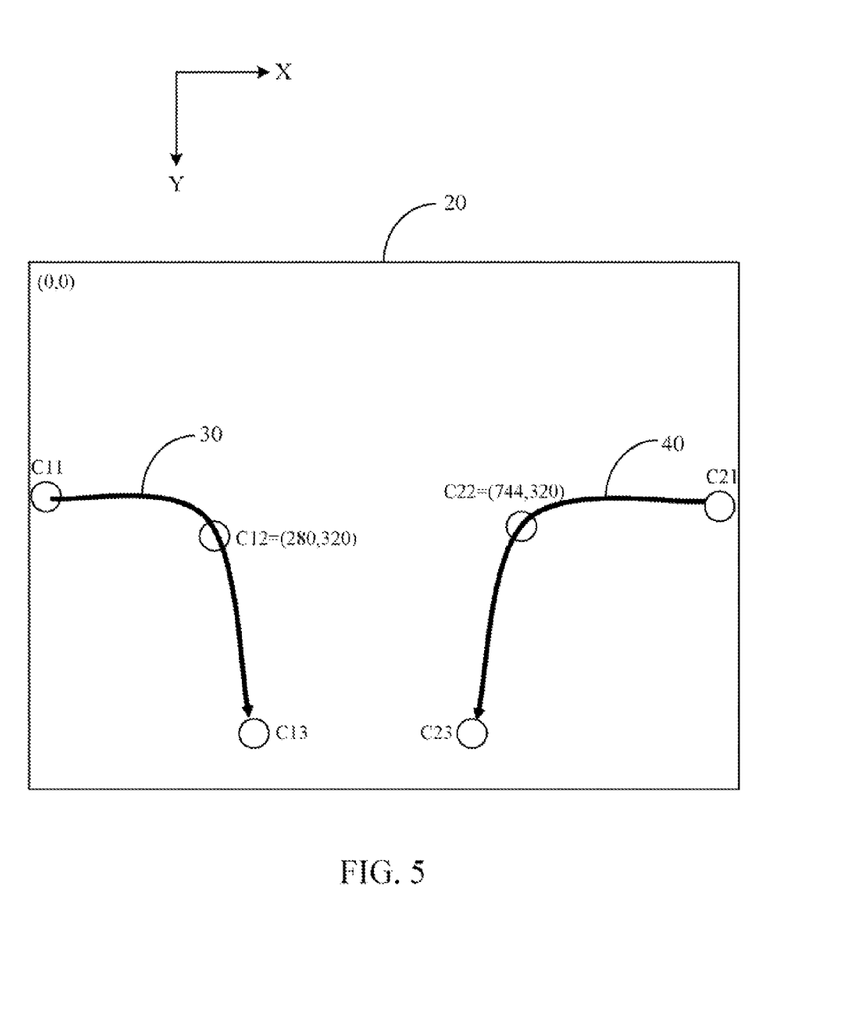
FIG. 5 is a schematic diagram of an example of drawing a first curve and a second curve on the touch panel of the electronic device.

For example, as shown in FIG. 5, a first curve 30 represents the first figure, and a second curve 40 represents the second figure. The representative points of the first curve 30 include the start point C11(0, 300), the middle point C12(280, 320), and the end point C13(300, 0). The representative points of the second curve 40 include the start point C21(1024, 300), the middle point C22(744, 320), and the end point C23(724, 0). In some embodiments, a resolution of the touch panel 20 may be 1024*600, a maximum value along an X-axis of a coordinate system of the touch panel 20 is 1024, a maximum value along a Y-axis of the coordinate system of the touch panel 20 is 600, a left corner point of the touch panel 20 is determined as an origin of the coordinate system of the touch panel 20.

Figure 6:
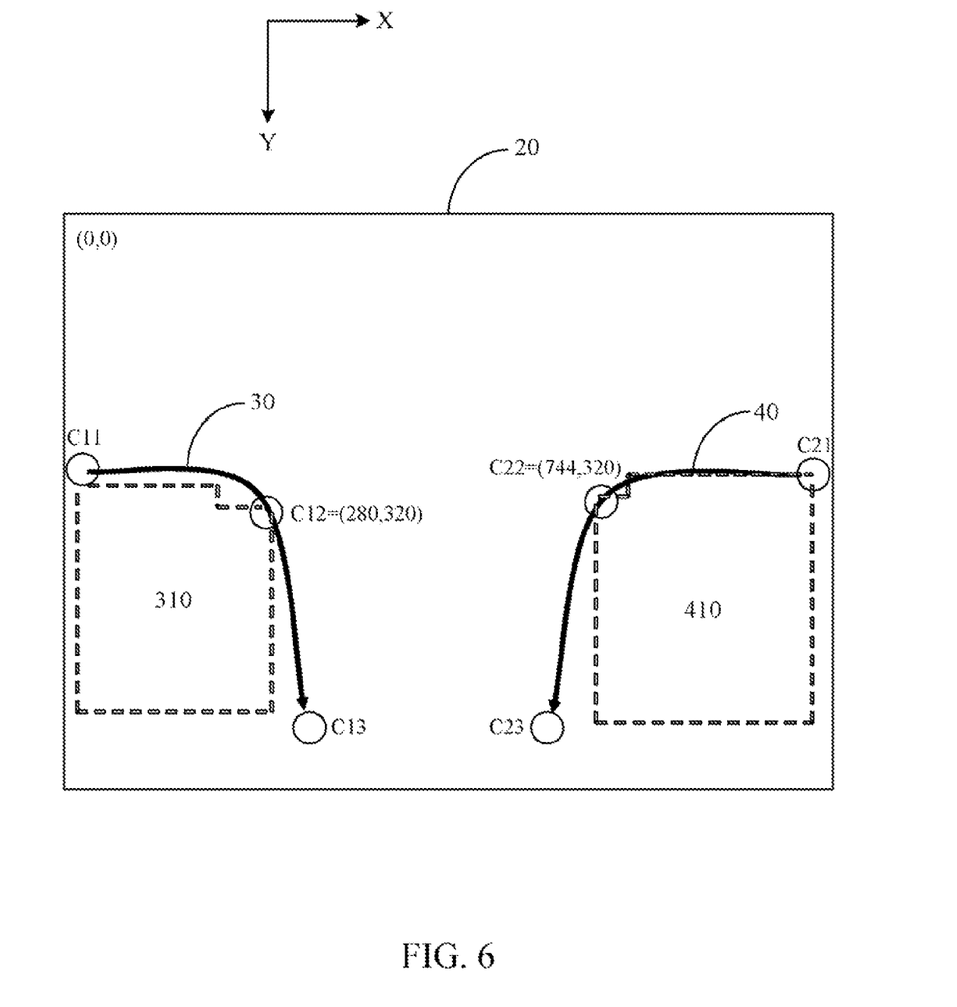
FIG. 6 is a schematic diagram of an example of a first display area and a second display area determined by the first curve and the second curve.

The setting module 201 determines a first display area 310 according to the coordinates of the representative points of the first figure, and determines a second display area 410 according to the coordinates of the representative points of the second figure. For example, as shown in FIG. 6, the first display area 310 is a first polygon determined based on the start point C11 and the middle point C12 of the first curve 30, and the second display area 410 is a second polygon determined based on the start point C21 and the middle point C22 of the second curve 40.

In other embodiments, the first display area 310 may be a first rectangle determined based on the start point C11 and the end point C13 of the first curve 30, and the second display area 410 is a second rectangle determined based on the start point C21 and the end point C23 of the second curve 40. For example, a top left corner of the first rectangle is the start point C11 of the first curve 30, and a lower right corner of the first rectangle is the end point C13 of the first curve 30. A top right corner of the second rectangle is the start point C21 of the second curve 40, and a lower left corner of the second rectangle is the end point C23 of the second curve 40.

In step S2, the input interface of the electronic device 2 is started up when the user inputs data (e.g., text content) in the electronic device 2. In one embodiment, the input interface is divide into two parts, such as a first sub-keyboard (e.g., a left side sub-keyboard) and a second sub-keyboard (e.g., a right side sub-keyboard).

Figure 7:
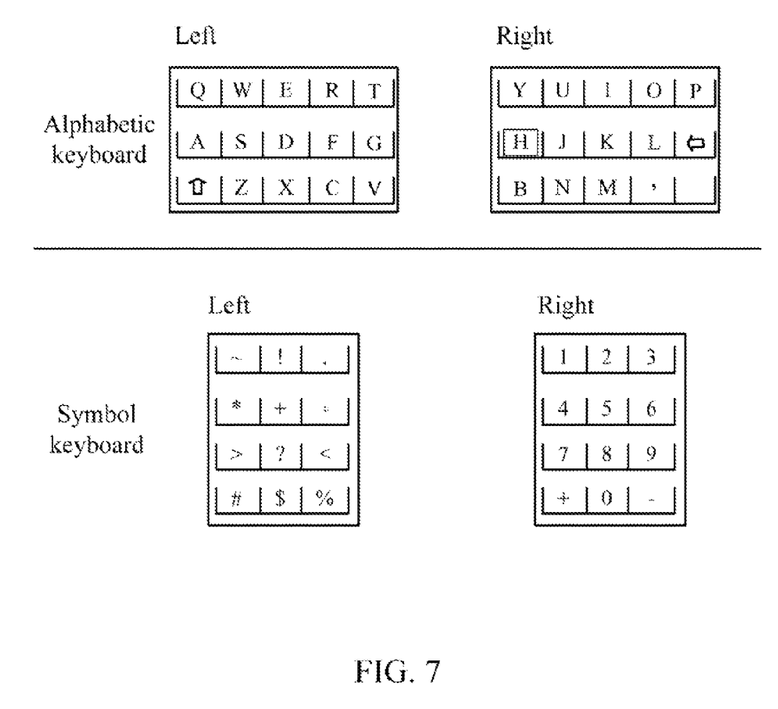
FIG. 7 is a schematic diagram of an example of dividing an alphabetic keyboard and a symbol keyboard of the input interface into a first sub-keyboard and a second sub-keyboard.

For example, as shown in FIG. 7, the input interface includes an alphabetic keyboard and a symbol keyboard. The alphabetic keyboard and the symbol keyboard are divided into two parts. The alphabetic keyboard includes a first alphabet sub-keyboard (e.g., a left side alphabet sub-keyboard) and a second alphabet sub-keyboard (e.g., a right side alphabet sub-keyboard). The symbol keyboard includes a first symbol sub-keyboard (e.g., a left side symbol sub-keyboard) and a second symbol sub-keyboard (e.g., a right side symbol sub-keyboard).

In step S3, the obtaining module 202 obtains a first sub-keyboard and a second sub-keyboard of the input interface when the input interface is started up. If a current input interface is the alphabetic keyboard, the first sub-keyboard is the first alphabet sub-keyboard, and the second sub-keyboard is the second alphabet sub-keyboard. If the current input interface is the symbol keyboard, the first sub-keyboard is the first symbol sub-keyboard, and the second sub-keyboard is the second symbol sub-keyboard.

In step S4, the first displaying module 203 displays the first sub-keyboard in the first display area 310 by performing a zoom operation (e.g., zoom in/out) on the first sub-keyboard.

In step S5, the second displaying module 204 displays the second sub-keyboard in the second display area 410 by performing the zoom operation (e.g., zoom in/out) on the second sub-keyboard. It should be noted that in other embodiments, step S5 may be executed before step S4, or steps S5 and S4 are executed simultaneously.

Figure 8:
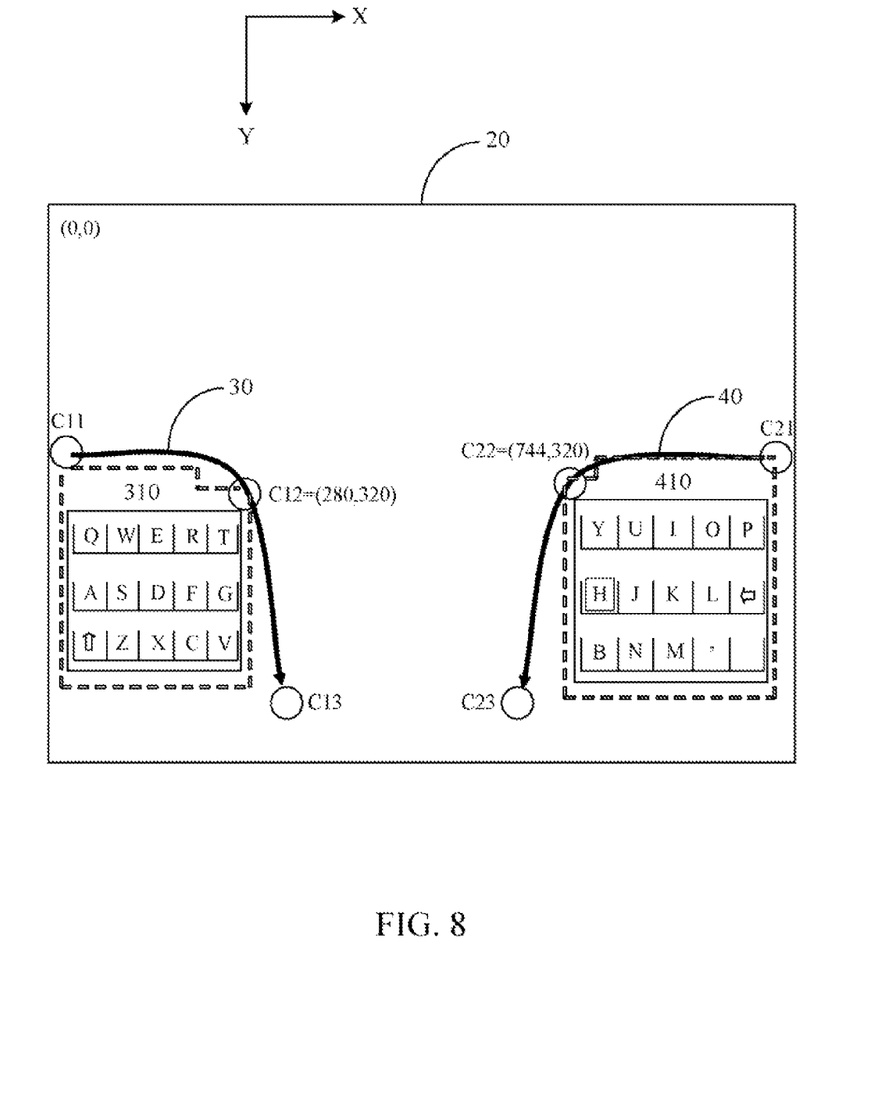
FIG. 8 is schematic diagram of an example of displaying the alphabetic keyboard in the first display area and the second display area.

For example, as shown in FIG. 8, a top right corner of the first alphabet sub-keyboard overlaps with the middle point C12 of the first curve 30, the zoom operation is executed on the first alphabet sub-keyboard so that a first ratio between the first alphabet sub-keyboard and the first display area 310 reaches a first preset value. In one embodiment, the first preset value may be 95%. That is, if the first ratio between the first alphabet sub-keyboard and the first display area 310 is greater than 95%, a zoom out operation is executed on the first alphabet sub-keyboard. If the first ratio between the first alphabet sub-keyboard and the first display area 310 is less than 95%, a zoom in operation is executed on the first alphabet sub-keyboard.

Similar to the first alphabet sub-keyboard, a top left corner of the second alphabet sub-keyboard overlaps with the middle point C22 of the second curve 40, the zoom operation is executed on the second alphabet sub-keyboard so that a second ratio between the second alphabet sub-keyboard and the second display area 410 reaches a second preset value. In one embodiment, the second preset value may also be 95%. That is, if the second ratio between the second alphabet sub-keyboard and the second display area 410 is greater than 95%, a zoom out operation is executed on the second alphabet sub-keyboard. If the second ratio between the second alphabet sub-keyboard and the second display area 410 is less than 95%, a zoom in operation is executed on the second alphabet sub-keyboard.

In the present application, the first alphabet sub-keyboard and the second alphabet sub-keyboard are displayed in the first display area 310 and the second display area 410 respectively in a default mode. If the user wants to use the symbol keyboard, a preset key on the alphabetic keyboard or a preset button on the touch panel 20 may be selected to change the alphabetic keyboard to the symbol keyboard. Then, the first symbol sub-keyboard is displayed in the first display area 310, and the second symbol sub-keyboard is displayed in the second display area 410 (referring to FIG. 9). For example, the preset key may a key in a lower left corner of the first alphabet sub-keyboard.

Figure 9:
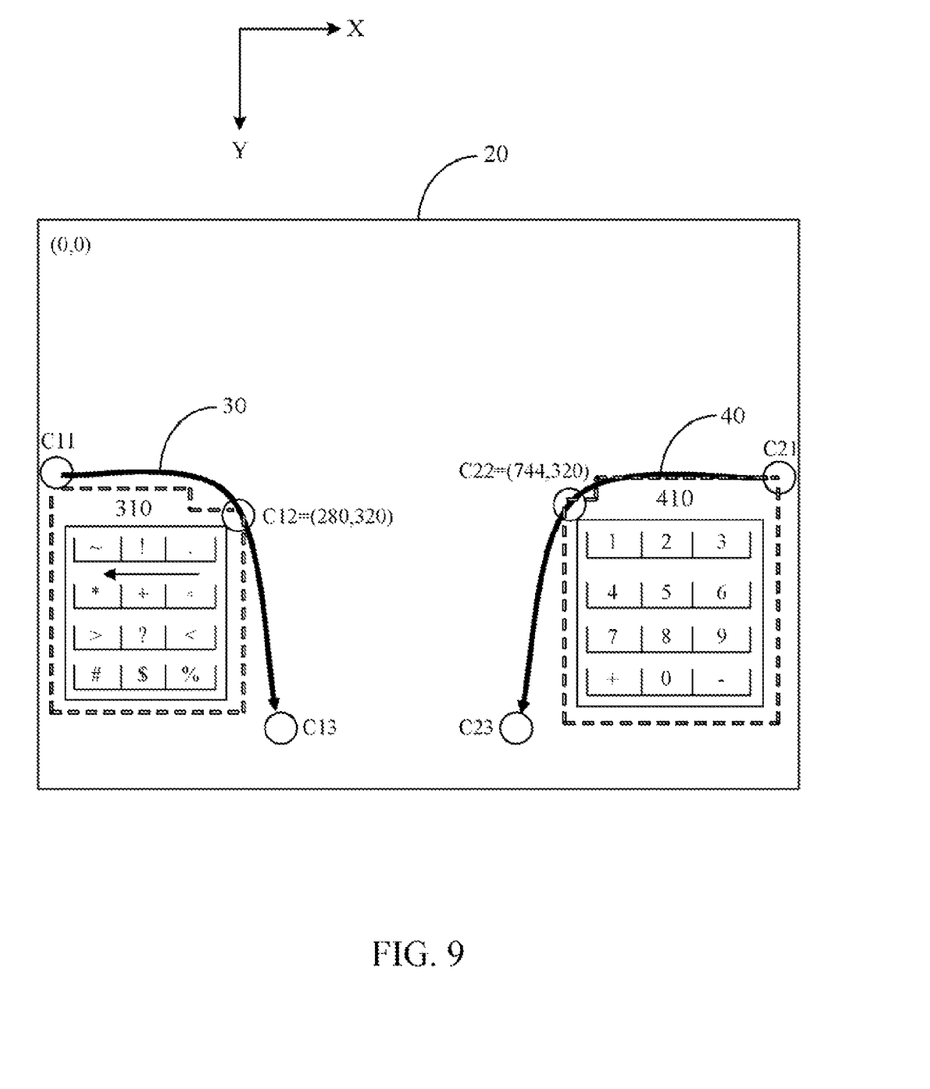
FIG. 9 is schematic diagram of an example of displaying the symbol keyboard in the first display area and the second display area.

A display method of the first symbol sub-keyboard and the second symbol sub-keyboard is similar to the display method of the first alphabet sub-keyboard and the second alphabet sub-keyboard. As shown in FIG. 9, a slide operation of the user's finger on the first symbol sub-keyboard or the second symbol sub-keyboard is used to display more symbols of the symbol keyboard.

As can be discerned from the above-mentioned descriptions, the sizes of the first curve 30 and the second curve 40 are changed in response to the sizes of the user's hands, and the first display area 310 determined by the first curve 30 and the second display area 410 determined by the second curve 40 make corresponding changes. That is, the present application can determine two display areas on the touch panel 20 of the electronic device 2 according to the touch ranges of the user's fingers on the touch panel 20, so that the input interface can be displayed in the two display areas according to the size of the user's fingers by dividing the input interface into a first sub-keyboard and a second sub-keyboard.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for displaying an input interface on a touch panel of an electronic device comprising a processor, the method comprising:
   determining a first display area and a second display area of the touch panel according to touch ranges of touch operations performed on the touch panel;
   receiving a first figure of the first display area and a second figure of the second display area drawn of the touch panel;
   obtaining a first sub-keyboard and a second sub-keyboard of the input interface;
   displaying the first sub-keyboard in the first display area by performing a zoom operation on the first sub-keyboard, wherein the zoom operation is performed on the first sub-keyboard by making a top right corner of the first sub-keyboard overlap a middle point of the first figure, and performing the zoom operation on the first sub-keyboard until a first ratio between the first sub-keyboard and the first display area reaches a first preset value; and
   displaying the second sub-keyboard in the second display area by performing the zoom operation on the second sub-keyboard, wherein the zoom operation is performed on the second sub-keyboard by making a top left corner of the second sub-keyboard overlap a middle point of the second figure, and performing the zoom operation on the second sub-keyboard until a second ratio between the second sub-keyboard and the second display area reaches a second preset value.

2. The method according to claim 1, wherein the first display area and the second display area are determined by:
   determining representative points of the first figure and the second figure, and storing coordinates of the representative points in a storage device of the electronic device; and
   determining the first display area according to the coordinates of the representative points of the first figure, and determining the second display area according to the coordinates of the representative points of the second figure.

3. The method according to claim 2, wherein the representative points of the first figure and the second figure comprise a start point, and an end point of each of the first figure and the second figure.

4. The method according to claim 2, wherein:
   the first display area is determined as a first polygon according to the start point and the middle point of the first figure, and the second display area is determined as a second polygon according to the start point and the middle point of the second figure; or
   the first display area is determined as a first rectangle according to the start point and the end point of the first figure, and the second display area is determined as a second rectangle according to the start point and the end point of the second figure.

5. An electronic device, comprising:
   a touch panel;
   a storage device;
   at least one processor; and
   one or more modules that are stored in the storage device and are executed by the at least one processor, the one or more modules comprising:
   a setting module that determines a first display area and a second display area of the touch panel according to touch ranges of touch operations performed on the touch panel, and receives a first figure of the first display area and a second figure of the second display area drawn of the touch panel;
   an obtaining module that obtains a first sub-keyboard and a second sub-keyboard of an input interface of the electronic device;
   a first displaying module that displays the first sub-keyboard in the first display area by performing a zoom operation on the first sub-keyboard, wherein the first displaying module performs a zoom operation on the first sub-keyboard by making a top right corner of the first sub-keyboard overlap a middle point of the first figure, and performing the zoom operation on the first sub-keyboard until a first ratio between the first sub-keyboard and the first display area reaches a first preset value; and
   a second displaying module that displays the second sub-keyboard in the second display area by performing the zoom operation on the second sub-keyboard, wherein the second displaying module performs the zoom operation on the second sub-keyboard by making a top left corner of the second sub-keyboard overlap a middle point of the second figure, and performing the zoom operation on the second sub-keyboard until a second ratio between the second sub-keyboard and the second display area reaches a second preset value.

6. The electronic device according to claim 5, wherein setting module determines a first display area and a second display area by:
   determining representative points of the first figure and the second figure, and storing coordinates of the representative points in the storage device; and
   determining the first display area according to the coordinates of the representative points of the first figure, and determining the second display area according to the coordinates of the representative points of the second figure.

7. The electronic device according to claim 6, wherein the representative points of the first figure and the second figure comprise a start point, and an end point of each of the first figure and the second figure.

8. The electronic device according to claim 6, wherein:
   the first display area is determined as a first polygon according to the start point and the middle point of the first figure, and the second display area is determined as a second polygon according to the start point and the middle point of the second figure; or
   the first display area is determined as a first rectangle according to the start point and the end point of the first figure, and the second display area is determined as a second rectangle according to the start point and the end point of the second figure.

9. A non-transitory storage medium having stored thereon instructions that, when executed by a processor of an electronic device, causes the electronic device to perform a method for displaying an input interface on a touch panel of the electronic device, the method comprising:

determining a first display area and a second display area of the touch panel according to touch ranges of touch operations performed on the touch panel;

receiving a first figure of the first display area and a second figure of the second display area drawn of the touch panel;

obtaining a first sub-keyboard and a second sub-keyboard of the input interface;

displaying the first sub-keyboard in the first display area by performing a zoom operation on the first sub-keyboard, wherein the zoom operation is performed on the first sub-keyboard by making a top right corner of the first sub-keyboard overlap a middle point of the first figure, and performing the zoom operation on the first sub-keyboard until a first ratio between the first sub-keyboard and the first display area reaches a first preset value; and displaying the second sub-keyboard in the second display area by performing the zoom operation on the second sub-keyboard, wherein the zoom operation is performed on the second sub-keyboard by making a top left corner of the second sub-keyboard overlap a middle point of the second figure, and performing the zoom operation on the second sub-keyboard until a second ratio between the second sub-keyboard and the second display area reaches a second preset value.

10. The non-transitory storage medium according to claim 9, wherein the first display area and the second display area are determined by:

determining representative points of the first figure and the second figure, and storing coordinates of the representative points in a storage device of the electronic device; and determining the first display area according to the coordinates of the representative points of the first figure, and determining the second display area according to the coordinates of the representative points of the second figure.

11. The non-transitory storage medium according to claim 10, wherein the representative points of the first figure and the second figure comprise a start point, and an end point of the first figure and the second figure.

12. The non-transitory storage medium according to claim 10, wherein:

the first display area is determined as a first polygon according to the start point and the middle point of the first figure, and the second display area is determined as a second polygon according to the start point and the middle point of the second figure; or the first display area is determined as a first rectangle according to the start point and the end point of the first figure, and the second display area is determined as a second rectangle according to the start point and the end point of the second figure.

13. The non-transitory storage medium according to claim 9, wherein the medium is selected from the group consisting of a hard disk drive, a compact disc, a digital video disc, and a tape drive.

* * * * *